(12) United States Patent
Duan et al.

(10) Patent No.: US 11,703,113 B2
(45) Date of Patent: Jul. 18, 2023

(54) ELECTRIFIED PROPULSION SYSTEM AND APPARATUS

(71) Applicant: GM GLOBAL TECHNOLOGY OPERATIONS LLC, Detroit, MI (US)

(72) Inventors: Chengwu Duan, Shanghai (CN); Jian Yao, Shanghai (CN); Lei Hao, Troy, MI (US); Dongxu Li, Troy, MI (US); Chunhao J. Lee, Troy, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/560,564

(22) Filed: Dec. 23, 2021

(65) Prior Publication Data
US 2023/0167886 A1 Jun. 1, 2023

(30) Foreign Application Priority Data
Nov. 30, 2021 (CN) .......................... 202111441384.7

(51) Int. Cl.
| | | |
|---|---|---|
| F16H 45/02 | (2006.01) | |
| H02K 7/108 | (2006.01) | |
| H02K 7/18 | (2006.01) | |
| H02K 1/16 | (2006.01) | |
| H02K 1/27 | (2022.01) | |
| B60K 1/02 | (2006.01) | |

(Continued)

(52) U.S. Cl.
CPC .............. *F16H 45/02* (2013.01); *H02K 1/16* (2013.01); *H02K 1/27* (2013.01); *H02K 7/108* (2013.01); *H02K 7/1823* (2013.01); *B60K 1/00* (2013.01); *B60K 1/02* (2013.01); *F16H 2045/005* (2013.01)

(58) Field of Classification Search
CPC ...... F16H 45/02; H02K 1/16; H02K 277/108; H02K 277/1823
See application file for complete search history.

(56) References Cited

U.S. PATENT DOCUMENTS

| | | | |
|---|---|---|---|
| 8,545,355 B2 * | 10/2013 | Frait .................. | B60L 50/16 475/5 |
| 9,912,203 B2 * | 3/2018 | Lucchi ................ | H02K 15/022 |

(Continued)

FOREIGN PATENT DOCUMENTS

| | | |
|---|---|---|
| DE | 102019109907 A1 | 10/2019 |
| DE | 102019109910 A1 | 10/2019 |

(Continued)

*Primary Examiner* — Huan Le
(74) *Attorney, Agent, or Firm* — Quinn IP Law (57) ABSTRACT

An electrified drivetrain system that maximizes power density, is readily packaged, and improves drivability is described. It includes a propulsion system having an axial-flux rotating electric machine, a torque converter having a selectable one-way clutch, and an output member that is couplable to a drivetrain. The axial-flux rotating electric machine include a first rotor coaxially arranged with a first electric stator. The torque converter includes a fluidic stator, a pump, a turbine and a torque converter clutch. The axial-flux rotating electric machine is arranged coaxially with the torque converter. The first rotor of the axial-flux rotating electric machine is coupled to the pump of the torque converter, and the turbine of the torque converter is rotatably coupled to the output member.

18 Claims, 8 Drawing Sheets

(51) Int. Cl.
    *F16H 45/00*     (2006.01)
    *B60K 1/00*     (2006.01)

(56) References Cited

U.S. PATENT DOCUMENTS

| | | | |
|---|---|---|---|
| 11,485,217 B2* | 11/2022 | Matsuoka | B60K 6/387 |
| 2012/0212085 A1* | 8/2012 | Fu | H02K 21/24 |
| | | | 310/58 |
| 2018/0034352 A1* | 2/2018 | Boettcher | H02K 1/182 |

FOREIGN PATENT DOCUMENTS

| | | |
|---|---|---|
| DE | 102019114092 A1 | 4/2020 |
| DE | 102019115839 A1 | 5/2020 |
| DE | 102021102807 A1 | 9/2021 |

* cited by examiner

ELECTRIFIED PROPULSION SYSTEM AND APPARATUS

CROSS-REFERENCE TO RELATED APPLICATIONS

This application claims the benefit of China Patent Application No. 202111441384.7, which was filed on Nov. 30, 2021, the disclosure of which is hereby incorporated by reference in its entirety.

TECHNICAL FIELD

The present disclosure relates to electrified drivetrain systems for vehicles.

BACKGROUND

Electrified drivetrains for vehicles include for example, battery electric vehicles, extended-range electric vehicles, plug-in hybrid electric vehicles and fuel cell hybrid electric vehicles. As is appreciated by skilled practitioners, design of electrified drivetrains includes optimization and tradeoffs between tractive power, weight, packaging volume, driving range, drivability, and other factors. Vehicle designers strive to achieve a fast, lightweight, responsive drivetrain system that can be packaged in a vehicle and is able to travel long distances with minimal need for electric charging.

Electric machines convert electrical energy into mechanical work by the production of torque. Electric vehicles, including hybrid vehicles, employ electric motors, such as induction motors and permanent magnet motors, to propel the vehicles, as well as to capture braking energy when acting as an electric generator. Generally, the electric motor includes a rotor that rotates during operation and an electric stator that is stationary. The rotor may contain a plurality of permanent magnets and rotates relative to the fixed electric stator. The rotor is connected to a shaft that also rotates with the rotor. The rotor, including the permanent magnets, is separated from the electric stator by a predetermined air gap. The electric stator includes conductors in the form of wire windings. When electrical energy is applied through the conductive wire windings, a magnetic field is generated. When electric energy or power is fed into the conductive windings of the electric stator, the power can be transferred over the air gap by a magnetic flux creating torque that acts on the permanent magnets in the rotor. In this manner, mechanical power can be transferred to or extracted from the rotating shaft. In an electric vehicle, the rotor thus transmits torque via the rotating shaft through a gear set to the drive wheels of the vehicle.

Two common types of electric motors include radial flux or axial flux type motors. In a radial flux motor, the rotor and electric stator are typically situated in a concentric or nested configuration, so that when an electric stator is energized, it creates a magnetic flux that extends radially from the electric stator to the rotor. Thus, the conductive windings in the electric stator are typically arranged perpendicular to an axis of rotation so that a magnetic field is generated that is oriented in the radial direction from the axis of rotation (along the shaft). In an axial flux motor, a magnetic field parallel to an axis of rotation is produced by the electrically conductive wire windings in the electric stator, so the magnetic flux extends parallel to an axis of rotation (parallel to the shaft). In certain applications, axial flux motors are desirable because they are relatively lightweight, generate increased power, and have a compact size as compared to radial flux motors.

There is a need for an electrified drivetrain system that maximizes power density, is readily packaged, and improves drivability.

SUMMARY

An electrified drivetrain system that maximizes power density, is readily packaged, and improves drivability is described. It includes a propulsion system having an axial-flux rotating electric machine, a torque converter having a selectable one-way clutch, and an output member that is couplable to a drivetrain. The axial-flux rotating electric machine include a first rotor coaxially arranged with a first electric stator. The torque converter includes a fluidic stator, a pump, a turbine and a torque converter clutch. The axial-flux rotating electric machine is arranged coaxially with the torque converter. The first rotor of the axial-flux rotating electric machine is coupled to the pump of the torque converter, and the turbine of the torque converter is rotatably coupled to the output member.

An aspect of the disclosure includes the output member coupled to the turbine of the torque converter is rotatably coupled to a drivetrain.

Another aspect of the disclosure includes the torque converter clutch being a normally-closed clutch, with the torque converter clutch being controlled to an open state during a launch maneuver.

Another aspect of the disclosure includes the axial-flux rotating electric machine being a multi-phase brushless permanent magnet DC rotating electric machine.

Another aspect of the disclosure includes the first rotor being a plurality of radially oriented permanent magnets affixed to a disc-shaped backplate.

Another aspect of the disclosure includes the first electric stator being a disc-shape device have a plurality of radially oriented posts, wherein each of the posts has an electrically conductive winding.

Another aspect of the disclosure includes the first rotor having a plurality of radially oriented permanent magnets affixed to a disc-shaped backplate. The first electric stator is a disc-shape device have a plurality of electrically conductive windings, and the plurality of radially oriented permanent magnets are arranged adjacent to the plurality of radially oriented electrically conductive windings in an axial orientation and are separated by an air gap.

Another aspect of the disclosure includes the torque converter clutch being one of a dog clutch, a preloaded friction clutch, or an electro-magnetic clutch.

Another aspect of the disclosure includes a second rotor coaxially arranged with the first rotor and the first electric stator, wherein the electric stator is interposed between the first and second rotors, and wherein the first rotor is coupled to the second rotor via a shaft.

Another aspect of the disclosure includes the first rotor being a first plurality of radially oriented permanent magnets affixed to a first disc-shaped backplate, wherein the second rotor includes a second plurality of radially oriented permanent magnets affixed to a second disc-shaped backplate, wherein the first electric stator is a disc-shape device have a plurality of electrically conductive windings, wherein the first plurality of radially oriented permanent magnets are arranged adjacent to a first side of the plurality of radially oriented electrically conductive windings in an axial orientation and are separated by a first air gap, and wherein the second plurality of radially oriented permanent magnets are arranged adjacent to a second side of a plurality of radially oriented electrically conductive windings in the axial orientation and are separated by a second air gap.

Another aspect of the disclosure includes a second electric stator coaxially arranged with the first rotor and the first electric stator, wherein the first rotor is interposed between the first and second electric stators.

Another aspect of the disclosure includes the first rotor being a first plurality of radially oriented permanent magnets affixed to a first side of a disc-shaped backplate, wherein the first rotor includes a second plurality of radially oriented permanent magnets affixed to a second side of the disc-shaped backplate, wherein the first electric stator comprises a disc-shape device having a first plurality of electrically conductive windings, wherein the first plurality of radially oriented permanent magnets are arranged adjacent to a first side of the first plurality of electrically conductive windings in an axial orientation and are separated by a first air gap, and wherein the second parallel of radially oriented permanent magnets are arranged adjacent to a second side of the first plurality of electrically conductive windings in the axial orientation and are separated by a second air gap.

Another aspect of the disclosure includes a propulsion system including a first axial-flux rotating electric machine and a second axial-flux rotating electric machine coaxially arranged with a torque converter. The first axial-flux rotating electric machine has a first rotor coaxially arranged with a first electric stator. The second axial-flux rotating electric machine has a second rotor coaxially arranged with a second electric stator. The torque converter includes a fluidic stator, a pump, a turbine and a torque converter clutch. The first and second axial-flux rotating electric machines are arranged coaxially with the torque converter, wherein the first rotor and the second rotor of the first axial-flux rotating electric machine are coupled to the pump of the torque converter, and wherein the turbine of the torque converter is rotatably coupled to an output member.

Another aspect of the disclosure includes a selectable one-way clutch coupled between the fluidic stator and a mechanical ground element.

Another aspect of the disclosure includes the torque converter clutch being a normally closed clutch; wherein the torque converter clutch is controlled to an open state during a launch maneuver.

Another aspect of the disclosure includes the first electric stator being a first disc-shape device have a first plurality of radially oriented electrically conductive windings and the first rotor includes a first plurality of radially oriented permanent magnets affixed to a first disc-shaped backplate. The second electric stator includes a second disc-shape device having a second plurality of radially oriented electrically conductive windings; and the second rotor includes a second plurality of radially oriented permanent magnets affixed to a second disc-shaped backplate. The first plurality of radially oriented permanent magnets are arranged adjacent to the first plurality of radially oriented electrically conductive windings in an axial orientation and are separated by a first air gap, and the second plurality of radially oriented permanent magnets are arranged adjacent to the second plurality of radially oriented electrically conductive windings in an axial orientation and are separated by a second air gap.

Another aspect of the disclosure includes a propulsion system having a first axial-flux rotating electric machine, a second axial-flux rotating electric machine, a first torque converter, and a second torque converter. The first axial-flux rotating electric machine, the second axial-flux rotating electric machine, the first torque converter, and the second torque converter are coaxially arranged. The first axial-flux rotating electric machine includes a first rotor coaxially arranged with a first electric stator, and the second axial-flux rotating electric machine includes a second rotor coaxially arranged with a second electric stator. The first torque converter includes a first fluidic stator, a first pump, a first turbine and a first torque converter clutch. The second torque converter includes a second fluidic stator, a second pump, a second turbine and a second torque converter clutch. The first rotor of the first axial-flux rotating electric machine is coupled to the first pump of the first torque converter, and the second rotor of the second axial-flux rotating electric machine is coupled to the second pump of the second torque converter. The first turbine of the first torque converter is rotatably coupled to a first output member, and the second turbine of the second torque converter is rotatably coupled to a second output member.

Another aspect of the disclosure includes the first electric stator being a first disc-shape device having a first plurality of radially oriented electrically conductive windings. The first rotor includes a first plurality of radially oriented permanent magnets affixed to a first disc-shaped backplate, and the second electric stator comprises a second disc-shape device having a second plurality of radially oriented electrically conductive windings.

The second rotor includes a second plurality of radially oriented permanent magnets affixed to a second disc-shaped backplate. The first plurality of radially oriented permanent magnets are arranged adjacent to the first plurality of radially oriented electrically conductive windings in an axial orientation and are separated by a first air gap. The second plurality of radially oriented permanent magnets are arranged adjacent to the second plurality of radially oriented electrically conductive windings in an axial orientation and are separated by a second air gap.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

Figure 1:
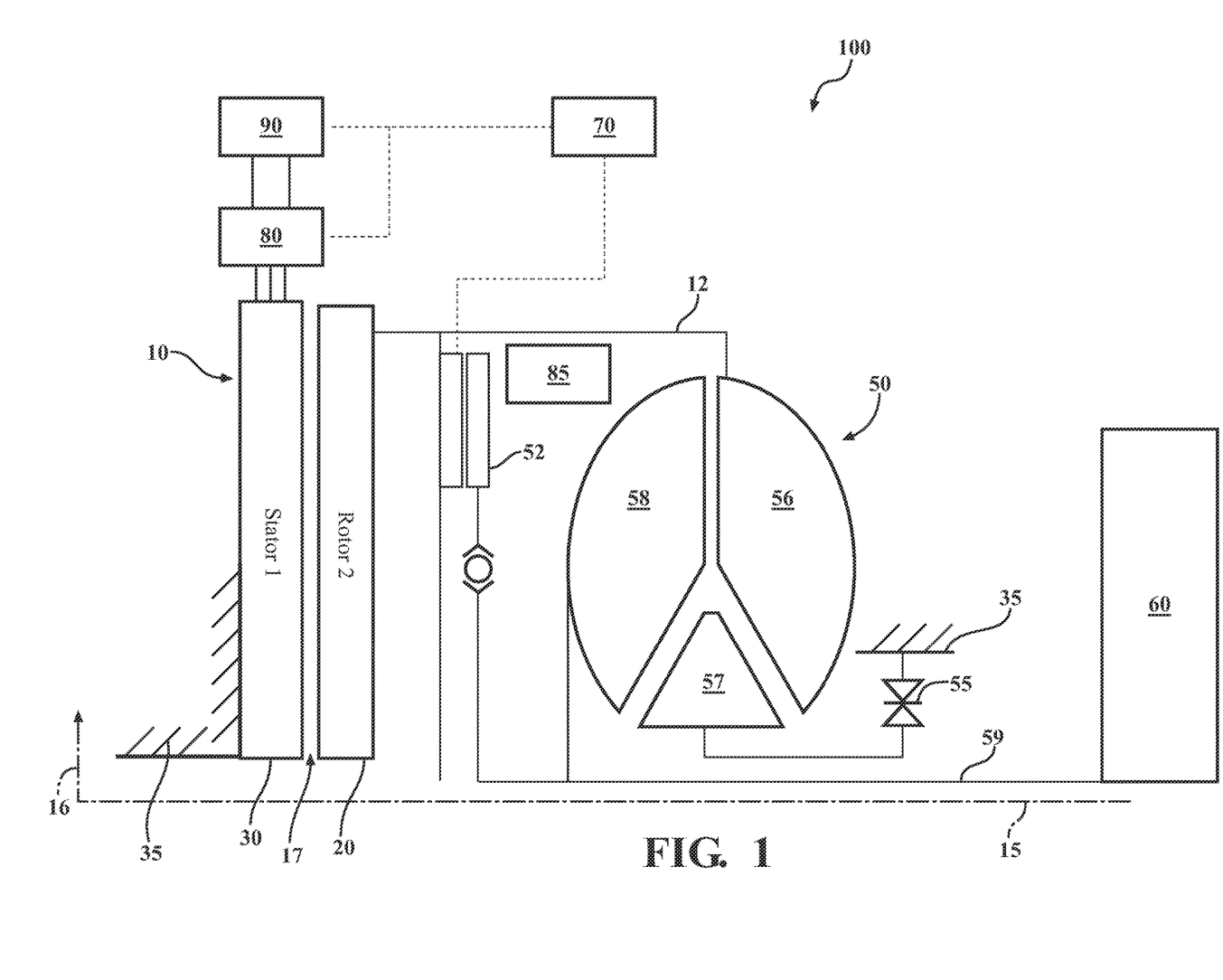
FIG. 1 schematically illustrates a propulsion system for an electrified drivetrain including an embodiment of an axial-flux rotating electric machine coupled to a torque converter, in accordance with the disclosure.
Figure 2:
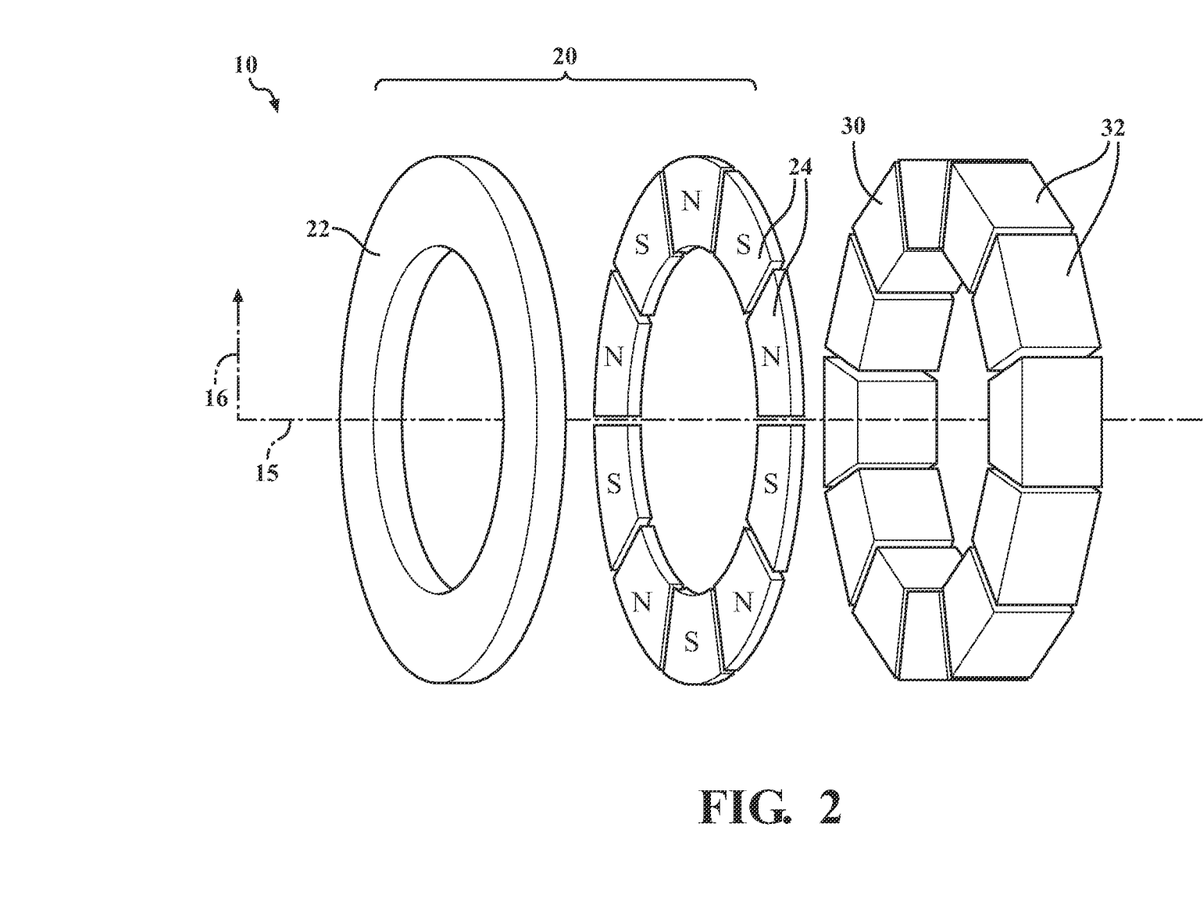
FIG. 2 schematically illustrates elements of the embodiment of the axial-flux rotating electric machine that is described with reference to FIG. 1, in accordance with the disclosure.

Referring now to the drawings, wherein the showings are for the purpose of illustrating certain exemplary embodiments and not for the purpose of limiting the same, FIGS. 1 and 2 schematically show elements of an embodiment of a propulsion system 100 that includes an axial-flux rotating electric machine 10 that is coupled via a novel torque converter 50 to a drivetrain 60 and controlled by a controller 70. Like numerals refer to like elements throughout the description. The description is provided in context of an axial orientation with axial reference line 15 and radial reference line 16. An axial flux rotary electric machine is a form of electric motor construction where the gap between the rotor and electric stator, and therefore the direction of magnetic flux between the two, is aligned parallel with the axis of rotation. In one embodiment, and as described herein, the axial-flux rotating electric machine 10 is configured as a brushless permanent magnet direct-current (DC) motor. In one embodiment, the propulsion system may include an internal combustion engine that couples to the axial-flux rotating electric machine 10 and is coupled via the torque converter 50 to the drivetrain 60.

In one embodiment, the propulsion system 100 is arranged on a vehicle, and the drivetrain 60 terminates at one or multiple vehicle wheels to provide tractive effort. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the drivetrain 60 includes a fixed-gear or continuously variable transmission that couples to vehicle wheels via a driveshaft, a transaxle, or a differential. In one embodiment, the propulsion system 100 is arranged as a stationary device, and the drivetrain 60 terminates at an actuator such as a fluidic pump.

The axial-flux rotary electric machine 10 is a high-voltage multi-phase electric motor/generator configured to convert stored electric energy to mechanical power and convert mechanical power to electric energy that may be stored in a high-voltage energy storage device (battery) 90. The battery 90 may be a high-voltage energy storage device, e.g., a multi-cell lithium ion device, an ultra-capacitor, or another device without limitation. Monitored parameters related to the battery 90 may include a state of charge (SOC), temperature, and others. In one embodiment, the battery 90 may electrically connect via an on-vehicle battery charger (not shown) to a remote, off-vehicle electric power source for charging while the vehicle is stationary. The battery 90 electrically connects to an inverter module 80 via a high-voltage DC bus to transfer high-voltage DC electric power via three-phase conductors to the axial-flux rotary electric machine 10 in response to control signals originating in the controller 70.

Referring again to FIGS. 1 and 2, this embodiment of the axial-flux rotary electric machine 10 includes a single rotor 20 and a single electric stator 30. The electric stator 30 electrically connects via the inverter module 80 and a high-voltage bus to the battery 90. The inverter module 80 is configured with control circuits including power transistors, e.g., IGBTs for transforming high-voltage DC electric power to high-voltage AC electric power and transforming high-voltage AC electric power to high-voltage DC electric power. The inverter module 80 may employ pulsewidth-modulating (PWM) control of the IGBTs to convert stored DC electric power originating in the battery 90 to AC electric power to drive the axial-flux rotary electric machine 10 to generate torque. Similarly, the inverter module 80 converts mechanical power transferred to the axial-flux rotary electric machine 10 to DC electric power to generate electric energy that is storable in the battery 90, including as part of a regenerative braking control strategy. The inverter module 80 receives motor control commands and controls inverter states to provide the motor drive and regenerative braking functionality. In one embodiment, a DC/DC electric power converter electrically connects to the high-voltage bus to provide electric power to a low-voltage battery via a low-voltage bus. The low-voltage battery electrically connects to an auxiliary power system to provide low-voltage electric power to low-voltage systems on the vehicle, including, e.g., electric windows, HVAC fans, seats, and other devices. The controller 70 is operatively connected to the inverter module 80 to control transfer of electric power between the battery 90 and the plurality of radially oriented electrically conductive windings 32 of the stator 30. The controller 70 controls the inverter module 80 to sequentially electrically activate the radially oriented electrically conductive windings 32 to exert a rotating magnetic force on a plurality of permanent magnets 24 affixed to the rotor 20 to effect rotation of the rotor 20, or to react torque to retard rotation of the rotor 20.

The rotor 20 includes a disc-shaped backplate 22 that is concentric to and affixed to a rotatable shaft member (shaft) 12. The backplate 22 includes a plurality of radially-oriented permanent magnets 24 that are arranged near an outer periphery of the backplate 22. The permanent magnets 24 may have alternating polarity. Adjacent pairs of the permanent magnets 24 define a channel therebetween, which may extend radially along a face of the rotor 20. In this manner, the permanent magnets 24 and the channel can together define a plurality of magnetic poles. As appreciated by those skilled in the art, the number, shape, placement, and orientation of permanent magnets 24 may vary from those shown. The rotor 20 is supported on the shaft 12 and supported with bearings that are housed in the stationary frame member 35. The center of the shaft 12 is arranged on and defines the axial reference line 15. The rotor 20 rotates with the shaft 12 during operation. The electric stator 30 is a disc-shaped device that is concentric to the shaft 12. The electric stator 30 is affixed to the stationary frame member 35. The electric stator 30 includes a plurality of electromagnetic components in the form of radially oriented electrically conductive windings 32 that are separated from one another to form electromagnetic poles.

The radially oriented electrically conductive windings 32 and the radially-oriented permanent magnets 24 are arranged adjacent to the radially oriented electrically conductive windings 32 in the axial direction and are separated by an air gap 17. The radially oriented electrically conductive windings 32 are electrically connected to the inverter module 80 in a multi-phase arrangement to generate electro-magnetic force that is exerted on the radially-oriented permanent magnets 24 to urge rotation of the rotor 20 when operating in a motoring mode to generate torque in a tractive operation, and to resist rotation of the rotor 20 when operating in a reactive mode to generate electric power in a regenerative operation. The radially oriented electrically conductive windings 32 may be electrically connected in a three-phase configuration in one embodiment, although the concepts described herein are not limited to three-phase. Other phase arrangements, e.g., two-phase, four-phase, etc., may be employed.

The torque converter 50 may be a fluidic torque coupling device that is coaxially arranged between the axial-flux rotating electric machine 10 and the drivetrain 60. The torque converter 50 includes a pump 56 that is rotatably coupled to the shaft 12, a fluidic stator 57, and a turbine 58 that is rotatably coupled to the output member 59 that rotatably couples to the drivetrain 60. The torque converter 50 also includes a controllable torque converter clutch 52 and a selectable one-way clutch (SOWC) 55. The torque converter clutch 52 may be configured as a dog clutch, a preloaded friction clutch, or an electro-magnetic clutch. The torque converter clutch 52 is arranged as a normally closed clutch that is controlled to an open state under certain operating conditions, e.g., during a launch maneuver.

The torque converter 50 operates to provide fluidic torque coupling between the pump 56 and the turbine 58 when the clutch 52 is deactivated or released, and provides mechanical torque coupling between the pump 56 and the turbine 58 when the clutch 52 is activated. There may be a differential in rotational speeds of the pump 56 and the turbine 58 when the clutch 52 is deactivated or released due to the fluid torque coupling, referred to as torque converter clutch slip. Torque converter clutch slip is measurable employing rotational speed sensors. The SOWC 55 is arranged to selectively couple the fluidic stator 57 to the stationary frame member 35, and thus facilitates operation in reverse when activated.

The shaft 12 couples to the pump 56 of the torque converter 50 to transfer torque to the output member 59, which is coupled to an embodiment of the drivetrain 60 in one embodiment.

The drivetrain 60 includes, e.g., a transmission. The transmission may be arranged in a step-gear configuration in one embodiment, and may include one or more differential gear sets and activatable clutches configured to effect torque transfer in one of a plurality of fixed gear states over a range of speed ratios between output member 59 of the torque converter 50 and a drivetrain component. The transmission may be one of various configurations, and may be an automatic transmission that automatically shifts between the fixed gear states.

The drivetrain 60 may include a gearset that mechanically couples to one or more axles that mechanically couple to one or more wheels in one embodiment. The drivetrain transfers tractive power to a road surface. The gearset of the drivetrain 60 may be in the form of a front transaxle and half-shafts (not shown) that rotatably coupled the output member 59 to one or more of the wheels. Alternatively, the gearset may be in the form of a rear differential and axles that rotatably coupled the output member 59 to one or more of the wheels. Alternatively, the gearset may be in the form of both a front transaxle arranged in conjunction with a rear driveshaft coupled to a differential that rotatably coupled the output member 59 to one or more of the wheels. Alternatively, or in addition, a power take-off (PTO) gear box (not shown) may be rotatably coupled to the output member 59. The propulsion system 100 is illustrative, and the concepts described herein apply to other propulsion systems that are similarly configured.

In one embodiment, a fluidic system 85 is arranged to supply hydraulic fluid to the torque converter 50, and is also fluidly connected to heat exchange elements arranged on the axial-flux rotating electric machine 10 and on the inverter module 80. The fluidic system 85 includes, by way of non-limiting examples, a fluidic pump, a sump, a cooling element, and associated plumbing circuit elements, and is configured to provide hydraulic fluid to the torque converter 50 and also remove heat from the electric machine 10 and the inverter module 80.

Figure 3:
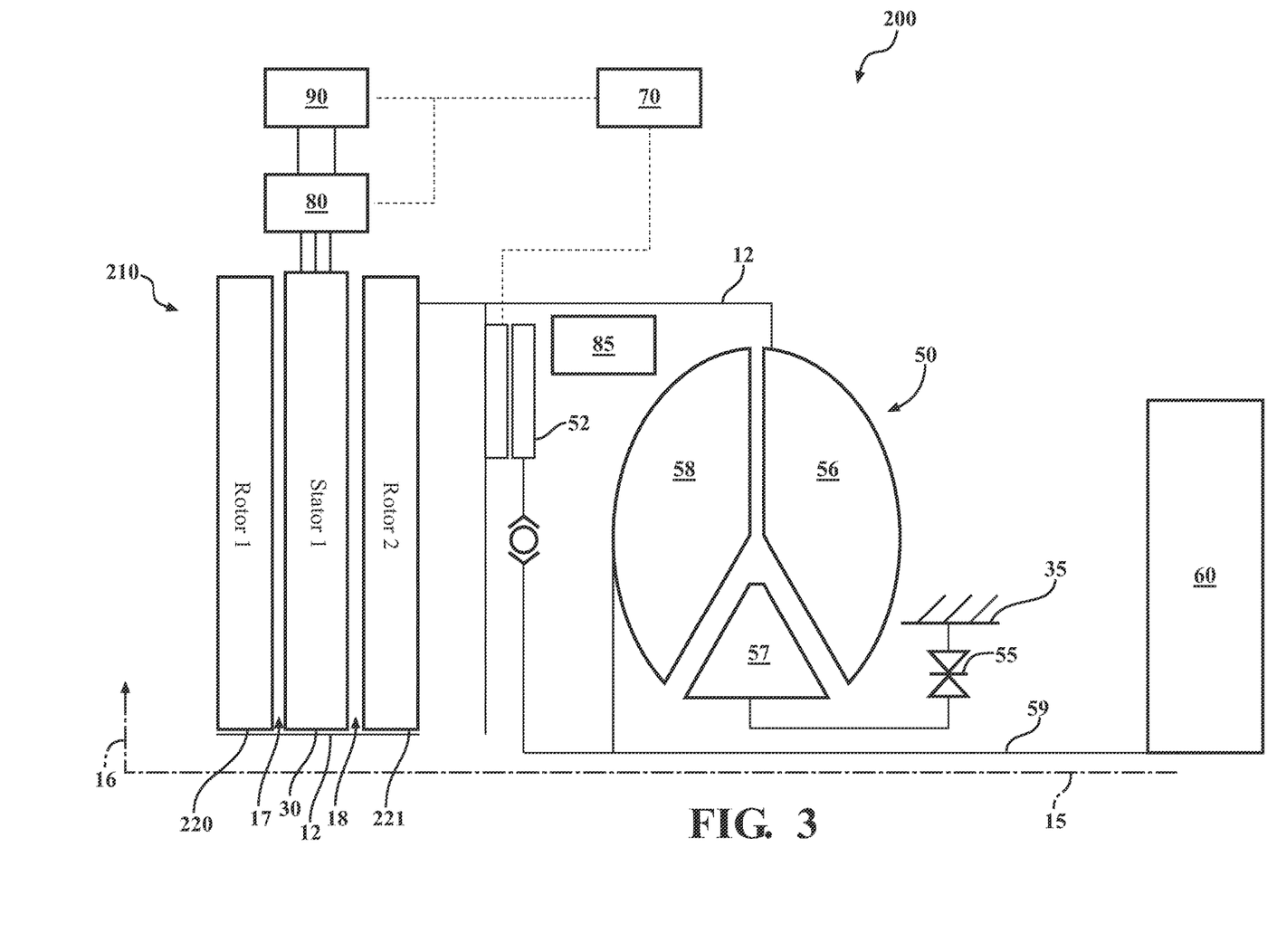
FIG. 3 schematically illustrates a propulsion system for an electrified drivetrain including another embodiment of an axial-flux rotating electric machine coupled to a torque converter, in accordance with the disclosure.
Figure 4:
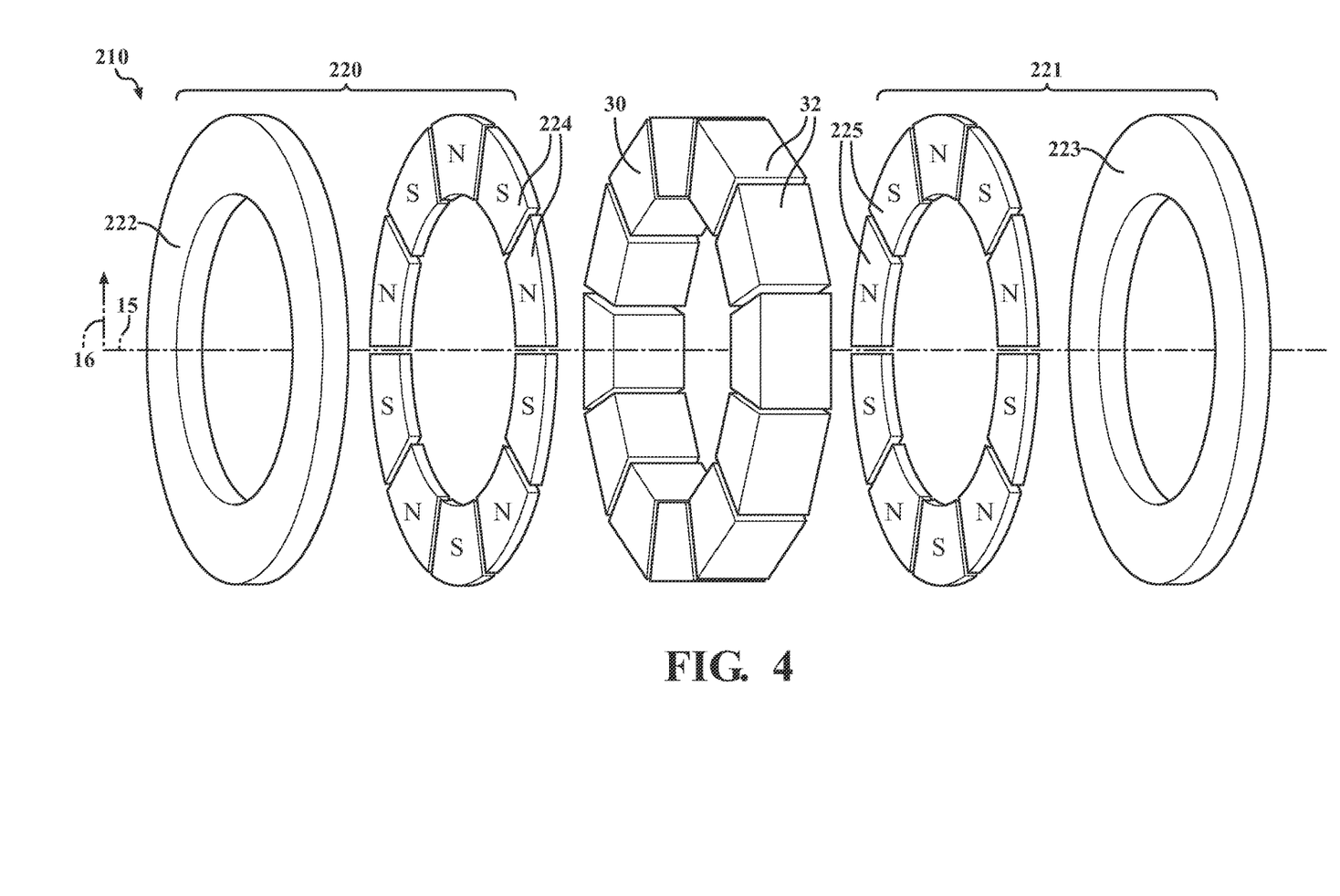
FIG. 4 schematically illustrates elements of the embodiment of the axial-flux rotating electric machine that is described with reference to FIG. 3, in accordance with the disclosure.

FIGS. 3 and 4 illustrate another embodiment of the propulsion system 200. In this embodiment, the axial-flux rotary electric machine 210 includes a single electric stator 30 that is coaxially arranged with and interposed between a first rotor 220 and a second rotor 221. The first and second rotors 220, 221 are coupled together via the shaft 12, and are separated from the single electric stator 30 by respective first and second air gaps 17 and 18, respectively. The radially oriented electrically conductive windings 32 of the electric stator 30 electrically connect via the inverter module 80 and high-voltage bus to the battery 90. Operation is controlled by the controller 70. The shaft 12 couples to the pump 56 of the torque converter 50 to transfer torque to the output member 59, which is coupled to an embodiment of the drivetrain 60 in one embodiment.

The first rotor 220 includes first backing plate 222 having a first set or plurality of the radially oriented permanent magnets 224 affixed thereto. The second rotor 221 includes a second backing plate 223 having a second set or plurality of the radially oriented permanent magnets 225 affixed thereto.

Figure 5:
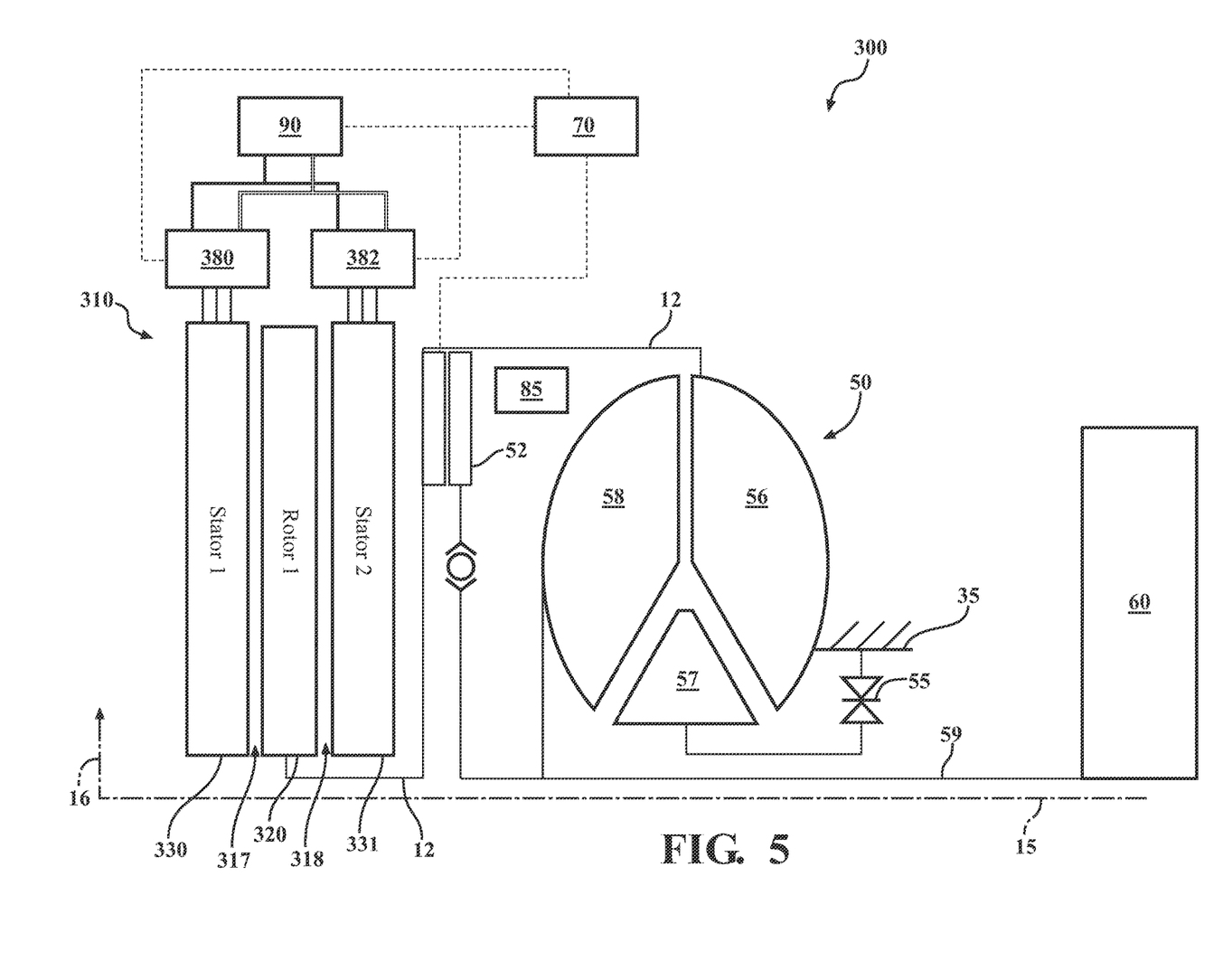
FIG. 5 schematically illustrates a propulsion system for an electrified drivetrain including another embodiment of an axial-flux rotating electric machine coupled to a torque converter, in accordance with the disclosure.
Figure 6:
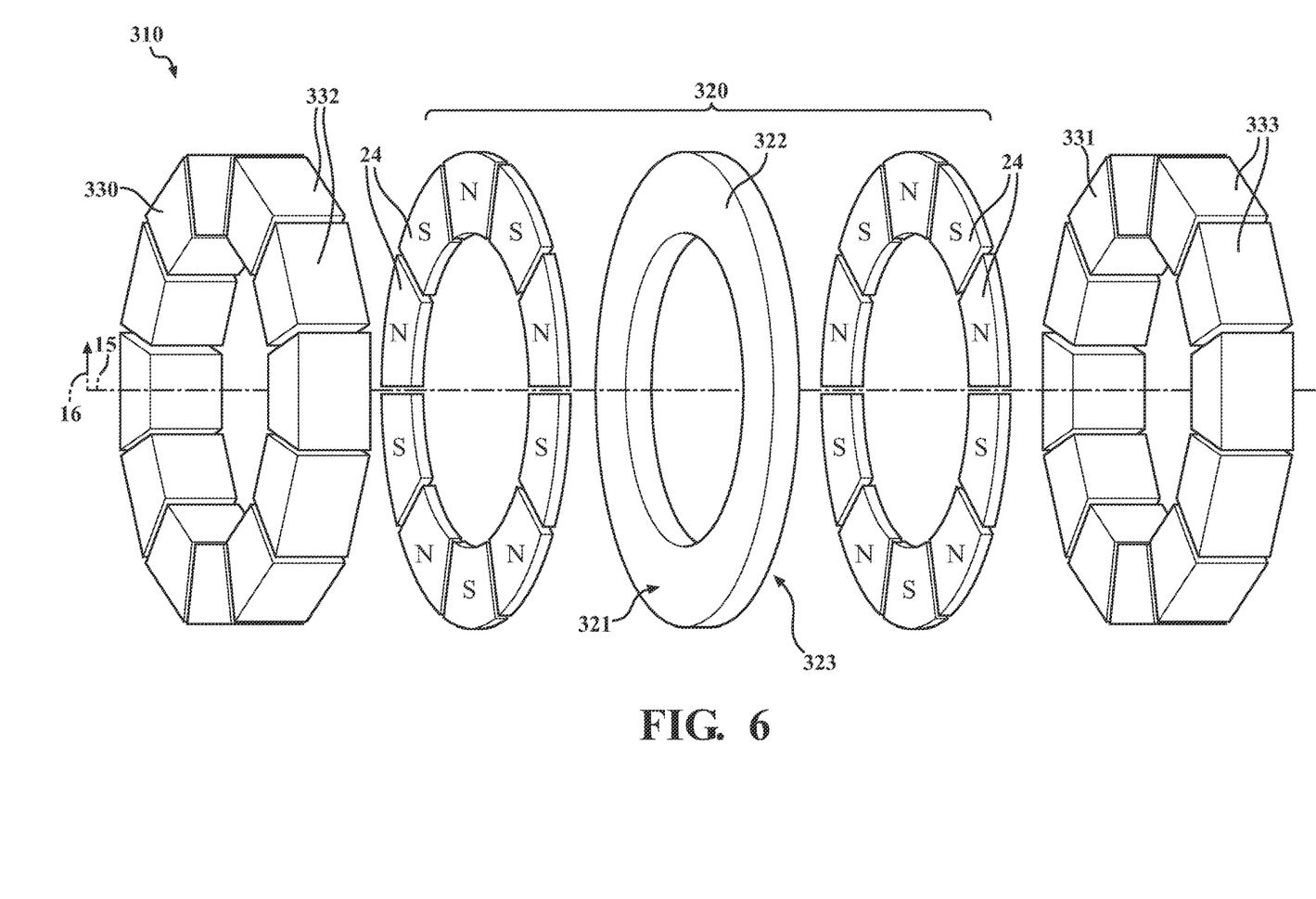
FIG. 6 schematically illustrates elements of the embodiment of the axial-flux rotating electric machine that is described with reference to FIG. 5, in accordance with the disclosure.

FIGS. 5 and 6 illustrate another embodiment of the propulsion system 300. In this embodiment, the axial-flux rotary electric machine 310 includes a first electric stator 330 and a second electric stator 331 that are coaxially arranged with a rotor 320, which is interposed therebetween. The rotor 320 is coupled to shaft 12. The first and second electric stators 330, 331 are separated from the rotor 320 by respective first and second air gaps 317 and 318, respectively. The shaft 12 couples to the pump 56 of the torque converter 50 to transfer torque to the output member 59, which is coupled to an embodiment of the drivetrain 60 in one embodiment.

The rotor 320 includes a disc-shaped backing plate 322 having a first set or plurality of the radially oriented permanent magnets 24 affixed to a first side 321, and a second set or plurality of the radially oriented permanent magnets 24 affixed to a second, opposite side 323 of the backing plate 322.

The first electric stator 330 has a first plurality of radially oriented electrically conductive windings 332, and the second electric stator 331 has a second plurality of radially oriented electrically conductive windings 333.

The first radially oriented electrically conductive windings 332 of the first electric stator 330 electrically connect via first inverter module 380 and high-voltage bus to the battery 90. The second radially oriented electrically conductive windings 333 of the second electric stator 331 electrically connect via second inverter module 382 and high-voltage bus to the battery 90. Operation is controlled by the controller 70.

In one embodiment, the first radially oriented electrically conductive windings 332 of the first electric stator 330 are rotationally aligned with the second radially oriented electrically conductive windings 333 of the second electric stator 331. This facilitates maximizing the electro-magnetic force being exerted by the first and second electric stators 330, 331 on the rotor 320. In one embodiment, the first radially oriented electrically conductive windings 332 of the first electric stator 330 are rotationally offset from the second radially oriented electrically conductive windings 333 of the second electric stator 331 by 180 electrical degrees of rotation. This facilitates minimizing ripple caused by the electro-magnetic force being exerted by the first and second electric stators 330, 331 on the rotor 320.

Figure 7:
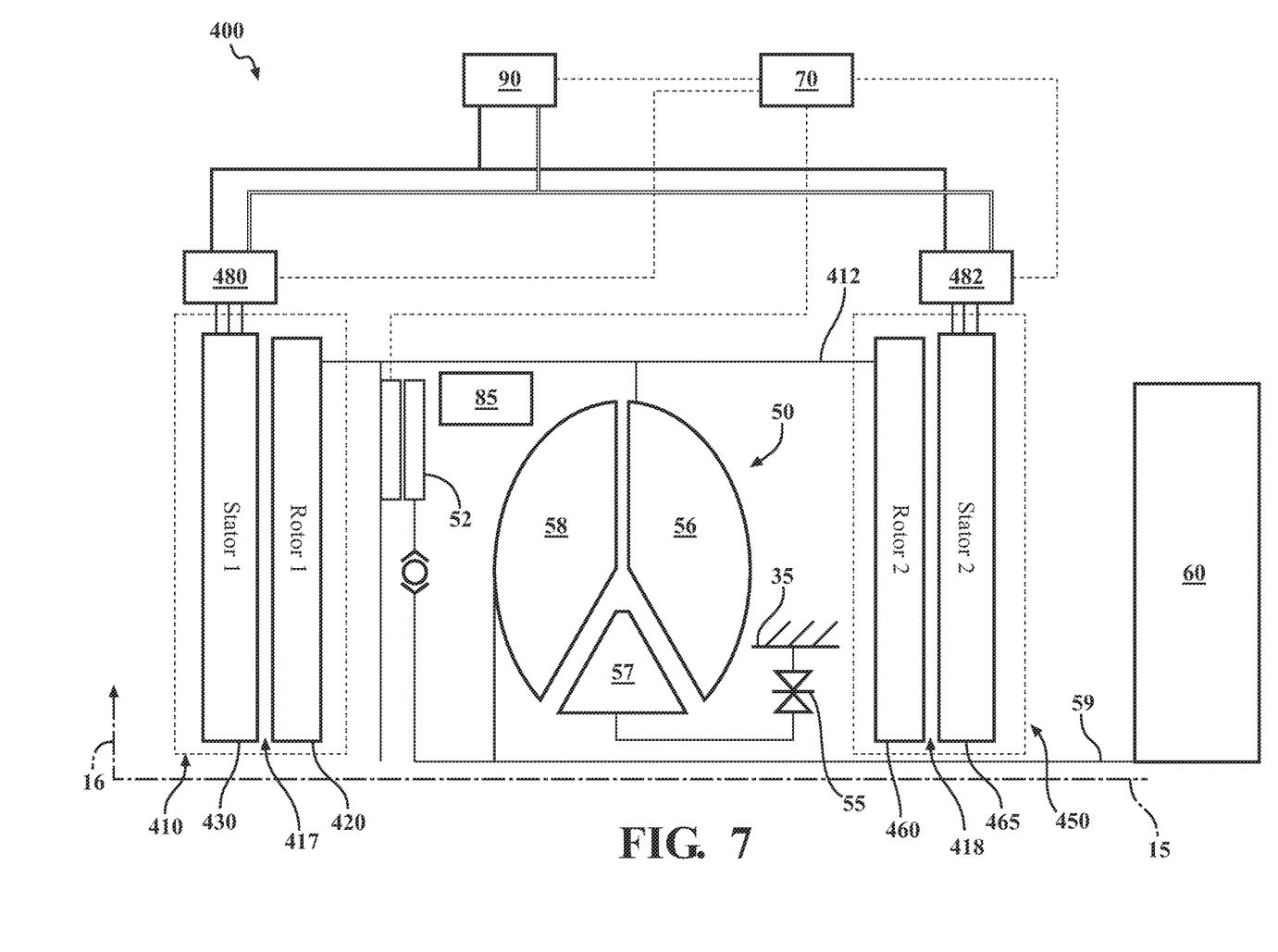
FIG. 7 schematically illustrates a propulsion system for an electrified drivetrain including another embodiment of an axial-flux rotating electric machine coupled to a torque converter, in accordance with the disclosure.

FIG. 7 illustrates another embodiment of the propulsion system 400. In this embodiment, a first axial-flux rotary electric machine 410 and a second axial-flux rotary electric machine 450 are coaxially arranged and coaxial with the torque converter 50. The first axial-flux rotary electric machine 410 and the second axial-flux rotary electric machine 450 are configured in a manner that is analogous to the configuration of the first axial-flux rotary electric machine 10 that is described with reference to FIG. 1. The shaft 12 couples to the pump 56 of the torque converter 50 to transfer torque to the output member 59, which is coupled to an embodiment of the drivetrain 60 in one embodiment.

The first axial-flux rotary electric machine 410 includes a first electric stator 430 that is coaxially arranged with a first rotor 420. The first rotor 420 is coupled to shaft 412. The first electric stator 430 is separated from the first rotor 420 by a first air gap 417. The second axial-flux rotary electric machine 450 includes a second electric stator 465 that is coaxially arranged with a second rotor 460. The second rotor 460 is also coupled to shaft 412. The second electric stator 465 is separated from the second rotor 460 by a second air gap 418. The first electric stator 430 is electrically connect via a first inverter module 480 and high-voltage bus to the battery 90. The second electric stator 465 is electrically connected via a second inverter module 482 and high-voltage bus to the battery 90. Operation is controlled by the controller 70.

Figure 8:
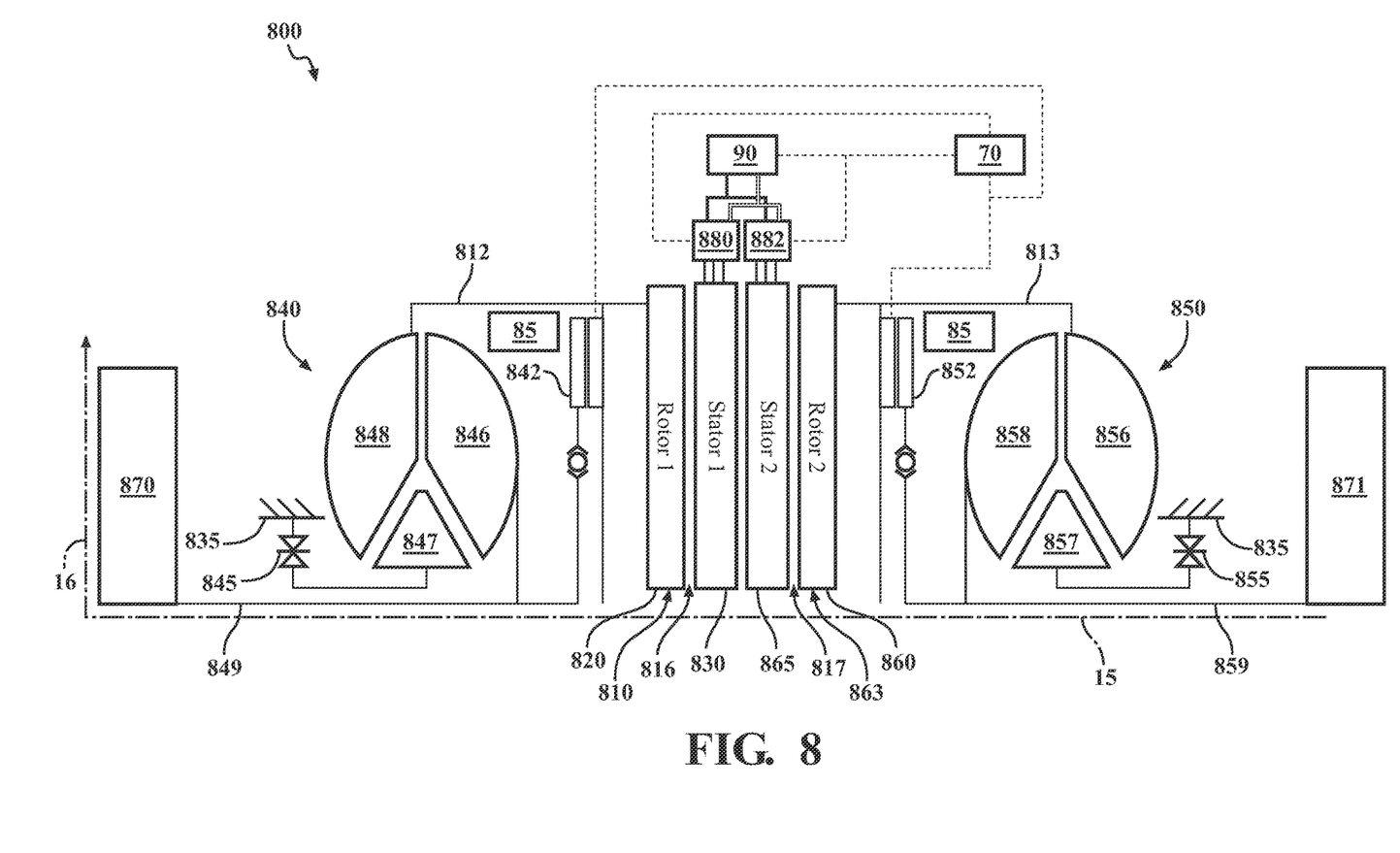
FIG. 8 schematically illustrates a propulsion system for an electrified drivetrain including another embodiment of an axial-flux rotating electric machine coupled to a torque converter, in accordance with the disclosure.

FIG. 8 illustrates another embodiment of the propulsion system 800. In this embodiment, a first axial-flux rotary electric machine 810 and a second axial-flux rotary electric machine 863 are coaxially arranged and coaxial with a first torque converter 850 and a second torque converter 840. The first axial-flux rotary electric machine 810 and the second axial-flux rotary electric machine 863 are configured in a manner that is analogous to the configuration of the first axial-flux rotary electric machine 10 that is described with reference to FIG. 1.

The first axial-flux rotary electric machine 810 includes a first electric stator 830 that is coaxially arranged with a first rotor 820, which is coupled to a first shaft 812. The first electric stator 830 is separated from the rotor 820 by a first air gap 816. The first shaft 812 is coupled to a first pump 848 of the first torque converter 840 to transfer torque to a first output member 849, which is coupled to one embodiment of the drivetrain 870, which may be a half-shaft coupled to a wheel in one embodiment. The first torque converter 840 is analogous to the torque converter 50, and includes pump 846, fluidic stator 847, and turbine 848 that is rotatably coupled to first output member 849 that rotatably couples to a first drivetrain 870. The first torque converter 840 also includes a controllable torque converter clutch 842 and a selectable one-way clutch (SOWC) 845.

The second axial-flux rotary electric machine 863 includes a second stator 865 that is coaxially arranged with a second rotor 860. The second rotor 860 is coupled to a second shaft 813. The second electric stator 865 is separated from the second rotor 860 by a second air gap 817. The second electric stator 865 is electrically connect via a second inverter module 882 and high-voltage bus to the battery 90. The second electric stator 865 is electrically connected via a second inverter module 882 and high-voltage bus to the battery 90. Operation is controlled by the controller 70.

The second shaft 813 is coupled to a second pump 856 of the second torque converter 850 to transfer torque to a second output member 859, which is coupled to one embodiment of the drivetrain 871, which may be a half-shaft coupled to a wheel in one embodiment. The second torque converter 850 is analogous to the torque converter 50, and includes the second pump 856, second fluidic stator 857, and second turbine 858 that is rotatably coupled to second output member 859 that rotatably couples to the second drivetrain 871. The second torque converter 850 also includes a controllable torque converter clutch 852 and a selectable one-way clutch (SOWC) 855.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link, a serial peripheral interface bus or another communication link. Communication includes exchanging data signals in various forms, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The concepts described herein relate to operating an embodiment of the propulsion system described herein, employing the axial-flux rotary electric machine 10 to reduce parameters associated with NVH and improve packaging.

That means the flux path is much shorter compared to that in radial flux machines, allowing the motor to be smaller for the same power, and have a higher power density and efficiency. Because the flux path in axial flux machines is one-dimensional, grain-oriented electrical steel can be used. The steel makes it easier for the flux to pass through, and this results in the efficiency gain. Furthermore, because axial-flux motors have a short axial length, packaging gains can be realized.

Elements of the electric machine can be built upon a flat structure, such as a printed circuit board, with the addition of coils and a bearing.

The coil winding process may be significantly simpler, as well as the process of joining the coil and core. Since the coils are flat, rectangular copper strips can more easily be used allowing high-current windings to be simplified. It may be possible to make the rotor significantly lighter in weight. The rotor-stator gap can be smaller than that of a radial-flux electric machine because it is not affected by centrifugal forces and can be adjusted after construction. A shorter magnetic path length can be realized as compared to a radial-flux electric machine. Many of the structural components are flat and may be produced without specialized casting or stamping tooling, thus reducing cost. The magnetic path through the windings is generally straight, enabling the use of grain-oriented electrical steel, with benefits including higher permeability and lower core losses as compared to nob-electrical steels. The arrangement with the axial-flux rotating electric machine arranged in close proximity to the torque converter facilitates and enables the use of transmission fluid as a cooling medium for the axial-flux rotating electric machine.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A propulsion system, comprising:
an axial-flux rotating electric machine including a first rotor coaxially arranged with a first electric stator;
a second electric stator coaxially arranged with the first rotor and the first electric stator;
a torque converter, including a fluidic stator, a pump, a turbine and a torque converter clutch;
a selectable one-way clutch coupled to the fluidic stator;
wherein the axial-flux rotating electric machine is arranged coaxially with the torque converter;
wherein the first rotor of the axial-flux rotating electric machine is coupled to the pump of the torque converter;
wherein the turbine of the torque converter is rotatably coupled to an output member;
wherein the first rotor is interposed between the first and second electric stators;
wherein the first rotor includes a first plurality of radially oriented permanent magnets affixed to a first side of a disc-shaped backplate;
wherein the first rotor includes a second plurality of radially oriented permanent magnets affixed to a second side of the disc-shaped backplate;
wherein the first electric stator comprises a disc-shape device having a first plurality of electrically conductive windings;
wherein the first plurality of radially oriented permanent magnets are arranged adjacent to a first side of the first plurality of electrically conductive windings in an axial orientation and are separated by a first air gap; and
wherein the second plurality of radially oriented permanent magnets are arranged adjacent to a second side of the first plurality of electrically conductive windings in the axial orientation and are separated by a second air gap.

2. The propulsion system of claim 1, wherein the output member coupled to the turbine of the torque converter is rotatably coupled to a drivetrain.

3. The propulsion system of claim 1, wherein the torque converter clutch comprises a normally-closed clutch; and wherein the torque converter clutch is controlled to an open state during a launch maneuver.

4. The propulsion system of claim 1, wherein the axial-flux rotating electric machine comprises a multi-phase brushless permanent magnet DC rotating electric machine.

5. The propulsion system of claim 1, wherein the first electric stator comprises a disc-shape device having a plurality of radially oriented posts, wherein each of the posts has an electrically conductive winding.

6. The propulsion system of claim 1, wherein the torque converter clutch comprises one of a dog clutch, a preloaded friction clutch, or an electro-magnetic clutch.

7. The propulsion system of claim 1, further comprising a second rotor coaxially arranged with the first rotor and the first electric stator; wherein the first electric stator is interposed between the first and second rotors; and wherein the first rotor is coupled to the second rotor via a shaft.

8. The propulsion system of claim 7,
wherein the second rotor includes a second plurality of radially oriented permanent magnets affixed to a second disc-shaped backplate.

9. A propulsion system, comprising:
a first axial-flux rotating electric machine and a second axial-flux rotating electric machine coaxially arranged with a torque converter;
the first axial-flux rotating electric machine including a first rotor coaxially arranged with a first electric stator;
the second axial-flux rotating electric machine including a second rotor coaxially arranged with a second electric stator;
the torque converter including a fluidic stator, a pump, a turbine and a torque converter clutch; and
the second electric stator coaxially arranged with the first rotor and the first electric stator;

wherein the first and second axial-flux rotating electric machines are arranged coaxially with the torque converter;

wherein the first rotor and the second rotor of the first axial-flux rotating electric machine are coupled to the pump of the torque converter;

wherein the turbine of the torque converter is rotatably coupled to an output member;

wherein the first rotor is interposed between the first and second electric stators;

wherein the first rotor includes a first plurality of radially oriented permanent magnets affixed to a first side of a disc-shaped backplate;

wherein the first rotor includes a second plurality of radially oriented permanent magnets affixed to a second side of the disc-shaped backplate;

wherein the first electric stator comprises a disc-shape device having a first plurality of electrically conductive windings;

wherein the first plurality of radially oriented permanent magnets are arranged adjacent to a first side of the first plurality of electrically conductive windings in an axial orientation and are separated by a first air gap; and wherein the second plurality of radially oriented permanent magnets are arranged adjacent to a second side of the first plurality of electrically conductive windings in the axial orientation and are separated by a second air gap.

10. The propulsion system of claim 9, further comprising a selectable one-way clutch coupled between the fluidic stator and a mechanical ground element.

11. The propulsion system of claim 9, wherein the torque converter clutch comprises a normally closed clutch; wherein the torque converter clutch is controlled to an open state during a launch maneuver.

12. The propulsion system of claim 9,
wherein the second electric stator comprises a second disc-shape device having a second plurality of radially oriented electrically conductive windings; and wherein the second rotor includes a second plurality of radially oriented permanent magnets affixed to a second disc-shaped backplate.

13. A propulsion system, comprising:
a first axial-flux rotating electric machine, a second axial-flux rotating electric machine, a first torque converter, and a second torque converter;
wherein the first axial-flux rotating electric machine, the second axial-flux rotating electric machine, the first torque converter, and the second torque converter are coaxially arranged;
the first axial-flux rotating electric machine including a first rotor coaxially arranged with a first electric stator;
the second axial-flux rotating electric machine including a second rotor coaxially arranged with a second electric stator;
the first torque converter including a first fluidic stator, a first pump, a first turbine and a first torque converter clutch;
the second torque converter including a second fluidic stator, a second pump, a second turbine and a second torque converter clutch;
wherein the first rotor of the first axial-flux rotating electric machine is coupled to the first pump of the first torque converter;
wherein the second rotor of the second axial-flux rotating electric machine is coupled to the second pump of the second torque converter;
wherein the first turbine of the first torque converter is rotatably coupled to a first output member; and
wherein the second turbine of the second torque converter is rotatably coupled to a second output member; and
the second electric stator coaxially arranged with the first rotor and the first electric stator;
 wherein the first rotor is interposed between the first and second electric stators;
wherein the first rotor includes a first plurality of radially oriented permanent magnets affixed to a first side of a disc-shaped backplate;
wherein the first rotor includes a second plurality of radially oriented permanent magnets affixed to a second side of the disc-shaped backplate;
wherein the first electric stator comprises a disc-shape device having a first plurality of electrically conductive windings;
wherein the first plurality of radially oriented permanent magnets are arranged adjacent to a first side of the first plurality of electrically conductive windings in an axial orientation and are separated by a first air gap; and
wherein the second plurality of radially oriented permanent magnets are arranged adjacent to a second side of the first plurality of electrically conductive windings in the axial orientation and are separated by a second air gap.

14. The propulsion system of claim 13, wherein the first torque converter clutch comprises a normally closed clutch; and wherein the first torque converter clutch is controlled to an open state during a launch maneuver.

15. The propulsion system of claim 13, wherein the second torque converter clutch comprises a normally closed clutch; and wherein the second torque converter clutch is controlled to an open state during a launch maneuver.

16. The propulsion system of claim 13,
wherein the second electric stator comprises a second disc-shape device having a second plurality of radially oriented electrically conductive windings;
wherein the second rotor includes a second plurality of radially oriented permanent magnets affixed to a second disc-shaped backplate.

17. The propulsion system of claim 13, further comprising a selectable one-way clutch coupled between the fluidic stator and a mechanical ground element.

18. The propulsion system of claim 13, wherein the torque converter clutch comprises one of a dog clutch, a preloaded friction clutch, or an electro-magnetic clutch.

* * * * *